Nov. 3, 1964    C. H. BODNER    3,154,860
MICROMETER CALIPERS
Filed Sept. 19, 1961
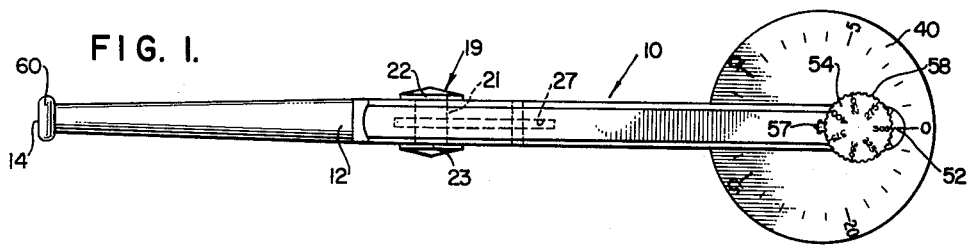
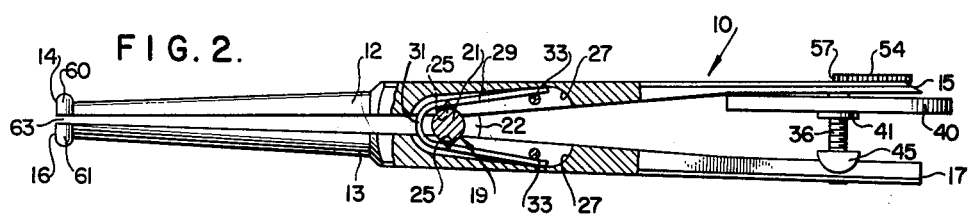
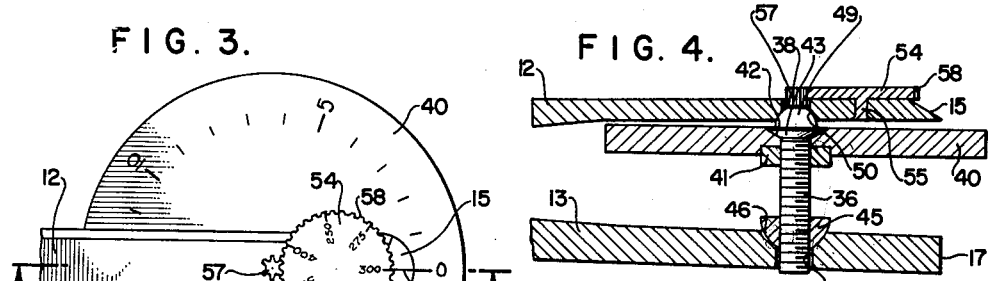
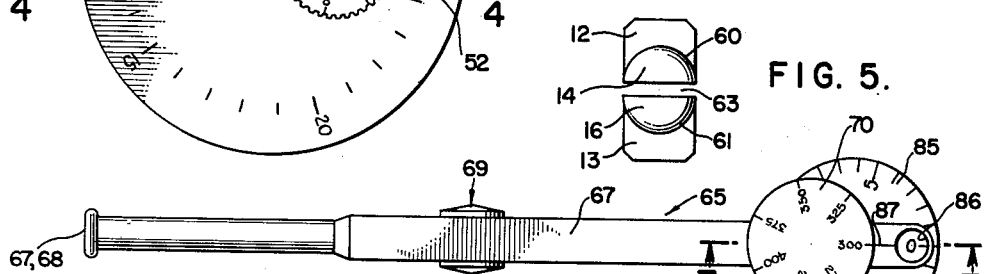
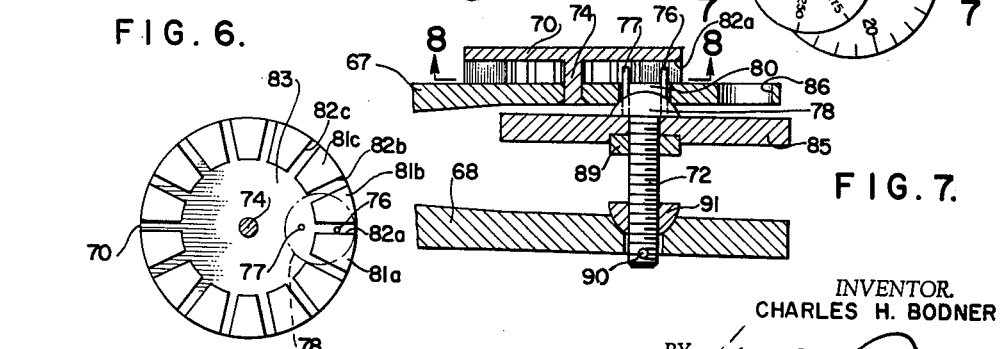
INVENTOR.
CHARLES H. BODNER
BY
ATTORNEY.

United States Patent Office 3,154,860
Patented Nov. 3, 1964

3,154,860
MICROMETER CALIPERS
Charles H. Bodner, 19401 Mesa Drive, Orange, Calif.
Filed Sept. 19, 1961, Ser. No. 139,180
6 Claims. (Cl. 33—148)

This invention relates generally to geometrical instruments for measuring the extent of separation of two surfaces or two points on a surface, and relates more particularly to micrometer calipers.

It is an object of this invention to provide a caliper which is adapted to be held and adjusted by an operator with one hand in a position allowing for convenience and ease of manipulation and for facilitating reckoning of the measurements sought.

The invention offers particular advantages when embodied as an inside caliper. In that form, it provides tips on the tool end of the caliper which are specially contoured to aid in centering of the tips within a bore to be measured.

Micrometer calipers of this invention include dials for indicating the measurements sought, and among the features of this invention is the provision of a caliper having a dial forming part of an adjusting means for the caliper.

Another object of this invention is to provide improved calipers in which the adjusting means is easily manipulated by a finger of the hand used to hold the instrument.

Still another object is to provide a caliper including means for readily re-setting the scale or dial when calibrating it to a zero setting.

A further object is to provide a caliper instrument in which the tool arms are pivotal with respect to each other midway between their ends and are biased in one direction by a single spring.

It is a general object of this invention to provide calipers of the above-mentioned character which are easy and handy to operate, reliable in use, simple and rugged in construction, and economical to manufacture.

Further objects and advantages of the invention will appear in the course of the following part of this specification, wherein the details of construction and mode of operation of two embodiments are described with reference to the accompanying drawing, in which:

FIGURE 1 is a plan view of one form of caliper of this invention;

FIGURE 2 is a side elevation of the caliper of FIGURE 1, the mid-portion thereof being shown in central longitudinal section;

FIGURE 3 is a plan view of the handle end of the instrument on an enlarged scale;

FIGURE 4 is a section taken along line 4—4 of FIGURE 3;

FIGURE 5 is an end view of the tip of the instrument on an enlarged scale;

FIGURE 6 is a plan view of another form of caliper of this invention;

FIGURE 7 is a detail section taken along line 7—7 of FIGURE 6; and,

FIGURE 8 is a view taken along line 8—8 of FIGURE 7 in the direction of the arrows on that line.

Referring again to FIGURES 1–5 of the drawing, the caliper of this invention which is illustrated in those figures is designated generally by reference numeral 10. It is an inside caliper for measuring internal dimensions, as the diameter of a bore for example. It is a micrometer caliper in that it includes a micrometer dial, to be described hereinafter, for indicating very exact measurements.

Caliper 10 comprises two rigid arms 12 and 13, the left hand end of the instrument as viewed in FIGURES 1 and 2, being the tool end and the right hand end being the handle end. The extreme end surfaces at the tool and handle ends respectively, of arm 12 are marked 14 and 15 and those of arm 13 are marked 16 and 17, respectively. A fulcrum 19 intermediate the ends of the arms provides for spreading the tool ends or tips of the arms apart as the handle ends are moved toward each other and vice versa.

Fulcrum 19 of the illustrated embodiment is formed as a spool consisting of a cylindrical pivot 21 with annular rims 22 and 23 on its ends, the rims being spaced apart to receive the arms between them and thus prevent side-wise motion of the arms with respect to each other. Each arm has a transversely extending recess 25 which may be V-shaped in cross-section to provide a bearing seat for the cylindrical pivot 21.

Each of the arms 12 and 13 has a longitudinally extending slot 27 open to the inside surface of the arm for reception of an end of a spring 29 which biases the arms in a direction to spread at their tool ends and conversely to approach each other at their handle ends. The slots 27 thus constitute spring seats for the ends respectively, of the spring 29. The spring of the illustrated embodiment is U-shaped having its bight portion 31 extending around the pivot 21. Each spring-seat 27 has a stop or peg 33 extending across it for engagement by the spring ends, respectively.

For manipulation of the instrument 10, there is an adjusting screw 36 extending at one end through an opening 37 in the handle of arm 13 and at its other end through an opening 38 in arm 12. The adjusting screw mounts a disc 40 which is held non-rotatably on the adjusting screw by a clamping nut 41 turned tight against one surface of the disc, the other surface of the disc having a countersink 42 which receives a head or rim 43 of the adjusting screw. The adjusting screw turns in a nut 45 which is non-rotatably seated in a socket 46 of the arm 13. To accommodate slight canting of the adjusting screw longitudinally of the arms and pivoting of the screw on arm 13 as the screw is turned into or in a direction out from the nut 45, the nut is cylindrical in a direction transversely of the arm 13 and its cross-section is that of a segment of a circle. The socket 46 is likewise cylindrical in a direction transversely of the arm 13 and its cross-section is a segment of a circle. For the caliper arm 12 the adjusting screw 36 is engageable in a ball and socket type relationship, the adjusting screw having a hemispherical end 49 which seats in a complementally shaped socket 50, the socket being a countersink of the opening 38.

As the disc 40 is rotated in a clockwise direction as viewed in FIGURE 3, it will turn the adjusting screw into the nut 45 allowing the spring 29 to urge the handle ends of the arms 12 and 13 toward each other, the arms fulcruming on the pivot 19 to spread apart at their tips. Rotation of the disc 40 in a counterclockwise direction as viewed in FIGURE 3 will turn the screw in a direction out from the nut 45 to spread the arms at their handle ends and close toward each other at their tips.

Disc 40 is large enough in radius to extend slightly beyond the handle end surface 15 of the arm 12. On that surface of the disc which faces toward the arm 12 there is a scale of graduations for reckoning changes of a magnitude of thousandths of an inch in the spacing of the tool tips, the disc 40 therefore being referred to hereinafter as a micrometer dial. Arm 12 has an index mark 52 serving as a pointer for indicating the extent or degree of rotation of the micrometer dial 40 from its starting point.

The graduations on the dial surface of the disc 40 are 25 in number, each representing a change of one one-thousandth of an inch in the spread of the arm tips. One full turn of 360 degrees of the adjusting screw represents a change 0.025 inch in the spread of the arm tips.

There is a counting dial 54 on the arm 12 for indicating the algebraic sum of rotations of the adjusting screw with respect to the position of the instrument arms when they are closed against each other at their tips. Counter dial 54 has a central stem 55 journaled in the arm 12, and is drivingly connected to the adjusting screw by a pinion 57 on that end of the screw which extends through the opening 38. Dial 54 is a gear having a circumferentially extending series of teeth 58 which mesh with teeth on the pinion 57. In the illustrated embodiment, there are seven times as many teeth on the counter dial 54 as on the pinion 57. Thus, as one complete turn of the adjusting screw represents a change of 0.025 inch in the spacing of the tool tips, one complete rotation of the counter dial 54 will represent a total change of 0.175 inch. The pointer 52 serves as an index point for the dial 54.

The illustrated instrument 10 is an inside caliper. It is designed for measuring bores in the range of 0.062 inch in diameter to about one-half inch, the magnitude of the minimum measurement for which the instrument 10 may be used being determined by the thickness of the tips of the instrument arms. Being an instrument for use in reckoning measurements in a limited range, the tool tips are specially contoured to aid in rapid centering of the tips in a bore to be measured. More particularly, the tool tips are formed as beads 60 and 61 on the arms 12 and 13 respectively. Each such bead is semicircular. When the tips are brought together, the circumference of the two beads is a circle of 0.250 inch in diameter. As the beads become spread apart, within the limited range for which the instrument has been specially designed for use, the bead circumferences will be tangent to the wall of the bore being measured and will slide on such bore wall to diametrically opposite tangent points of engagement with the bore, thereby to center the tool end of the instrument in the bore.

In the drawing, instrument 10 is shown in a position of adjustment having a space or gap 63 of 0.050 inch between its tips. A gap of that magnitude represents two full turns of the adjusting screw 36 and represents two-sevenths of a revolution of the counting dial 54. The counting dial is preferably graduated to enable direct reading of the magnitude of the diameter of a bore being measured, and accordingly, its scale begins at the minimum value of 0.250 inch and continues up to 0.425 inch, the graduation marks for these extremes being coincident at the 250 mark. In the example of the illustrated position of adjustment of the instrument 10, the tips or beads 60 and 61 being 0.250 inch in diameter, and the gap 63 being 0.050 inch, the sum of these values (0.300 inch) is directly readable from the instrument dials, in that the zero mark on dial 40 and the 300 mark on the counter dial 54 are aligned with the index point 52.

It will be noted that the scale of the counter dial 54 goes upward from its lower extreme in a counterclockwise direction as viewed in FIGURE 3, this being so because rotation of the micrometer dial 40 in a clockwise direction causes the counter dial 54 to rotate in a counterclockwise direction due to the direct pinion connection between these dials.

Calibration or zero setting of the dials is a simple operation involving mere backing off of the clamping nut 41 to release the micrometer dial 40 for zero setting, and then tightening the nut.

Referring to FIGURES 6–8, there is shown another embodiment of this invention, it being an inside caliper designated generally by reference numeral 65. Its lever arms 67 and 68 and its fulcrum 69 operate with respect to each other in the same way as their corresponding parts in the instrument 10 described above. Instrument 65 differs from instrument 10 in the manner in which its counter dial 70 is driven by its adjusting screw 72. In the case of instrument 65, the counter dial 70 is mounted by its stem 74 in arm 67 and is operatively engaged with the adjusting screw 72 to rotate in the same direction as the adjusting screw, whereas in the case of instrument 10, its counter dial rotates in a direction opposite to its adjusting screw 36. This different mode of operation for instrument 65 is effected by two pins 76 and 77 which project in an axial direction of the adjusting screw 72 from the hemispherical head 78 of screw 72 through an opening 80 in arm 67 for engagement with a circumferentially arranged series of radial vanes 81 on the underside of the counter dial. The vanes are separated from each other by radially extending slots 82, opening at their inner ends to a central recess 83, the circumference of which marks the inner ends of the vanes and slots. Pins 76 and 77 and the slots 82 are cam elements for imparting rotation to the counter dial 70.

For convenience in describing the manner in which adjusting screw 72 drives the counter dial 70, certain of the vanes 81 are referentially distinguished from one another in FIGURE 8, and the slots 82 are likewise distinguished from one another by suffixes $a$, $b$ and $c$, respectively, the relative disposition of parts in FIGURE 8 being such that the pin 76 of the adjusting screw extends into slot 82$a$ between vanes 81$a$ and 81$b$. The broken line circle around the pins 76 and 77 in FIGURE 8 represents the hemispherical head 78 of the adjusting screw 72. As the head rotates in a clockwise direction as viewed in FIGURE 8, the pin 76 slides in the slot 82$a$ as a cam against a radial edge of vane 81$a$ toward the inner end opening of slot 82$a$ thereby turning the dial 70 on its axis of stem 74 in a clockwise direction. The slots are spaced apart by a distance between their inner end openings, which is less than the space between the pins 76 and 77, so that just before pin 76 passes out from slot 82$a$ to enter the central recess 83, pin 77 will have entered slot 82$b$. Continued rotation of the screw head 78 causes pin 77 to slide into slot 82$b$ and rotate dial 70 through cam action, and then to slide out from slot 82$b$ as pin 76 enters the next slot 82$c$. Thus, it is seen that the pins alternate in entering the slots and that a 180 degree rotation of the adjusting screw 72 effects rotation of the dial in degrees equal to the central angle between adjacent slots. Adjusting screw 72 having a pitch of its screw threads, such that for each revolution it will effect a change of 0.025 inch in the spacing of the tips of the arms 67 and 68, and there being fourteen slots 82 in the counter dial 70, the dial will complete a full revolution as the adjusting screw makes seven complete revolutions. The dial 70 is marked in graduations similarly as its corresponding dial 54 in the instrument 10 of FIGURES 1–5.

Another point of difference between instruments 10 and 65 is that micrometer dial 85 of instrument 65 is smaller in diameter than its corresponding dial 40 in instrument 10, and its graduations in thousandths of an inch are viewed through a port 86 formed in the handle end of the lever arm 67. A mark 87 on the outside surface of arm 67 serves as an index for direct reading of a measurement from the graduations on the dials 85 and 70 in registry with the index mark.

Adjusting screw 72 has a nut 89 for clamping micrometer dial 85 non-rotatably on the screw against the undersurface of the head 78, of the screw. A projection 90 on the distal end of screw 72 serves as a stop when turned against the pivoting nut 91 of the screw to prevent unintended withdrawal of the screw from the nut 91.

In view of the above described relationship of component parts of instruments of this invention, including the location of the counting and micrometer dials in the handle end of such an instrument and the location of the fulcrum 19 or 69 midway between the handle and tool ends of the instrument, it is apparent that instruments of this invention are adapted to be held by an operator in one hand as the operator positions the instrument for making a desired measurement, and permits him to manipulate the micrometer dial with a finger or thumb of that hand to bring the tool tips against surfaces of a bore or other things to be measured. Thus, the instruments of this invention are convenient and handy to use as well as enabling quick centering in a bore to be measured.

While the particular micrometer calipers herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A bore micrometer caliper for use in the precision measurement of bore diameters, said caliper comprising a pair of elongated generally straight rigid arms located on the opposite sides of fulcrum means positioned between the midlength portions of said arms, one end of said arms having rounded feeler surfaces on their remote exterior faces adapted to be simultaneously engaged with diametrically opposed surfaces of a bore wall, means including spring means urging the feeler surface ends of said arms to pivot away from one another and the opposite outer ends of said arms toward one another while holding said arms resiliently assembled and pressed firmly against the opposite sides of said fulcrum means, adjustable rotary means socketed between the adjacent interior portions of the outer ends of said arms at points spaced substantially the same distance from said fulcrum means as are said feeler surfaces and effective to force said outer ends apart when rotated in one direction and permitting said spring means to pivot the feeler surface ends apart when rotated in the opposite direction, and scale means supported at the outer ends of said arms and operatively connected with said rotary means for indicating the diameter of a bore with precision when said feeler surfaces are in light contact therewith.

2. A bore caliper as defined in claim 1 characterized in that said fulcrum comprises a spool-like member having a cylindrical body portion formed at its outer ends with annular flanges spaced apart a distance corresponding to the width of the juxtaposed portions of said elongated arms, said arms being recessed on their inner faces to seat against the opposite sides of the main body of said fulcrum, and torsion spring means embracing said spool-like fulcrum, the opposite ends of said spring means being engaged with a respective one of said arms and cooperating therewith to hold said arms movably and resiliently assembled against said spool between the flanged ends thereof and to hold said adjustable rotary means assembled between the outer ends of said arms.

3. A bore caliper as defined in claim 1 characterized in that said scale means includes a first disc-like circular scale secured to said rotary means between the outer ends of said arms in a plane normal to their plane of movement toward and away from one another, a second disc-like circular scale rotatably supported on the exterior side of the arm from said first scale, and means fixed to said rotary means and extending through the arm into driving contact with said second scale.

4. A bore caliper comprising a pair of elongated rigid arms arranged generally parallel to one another and having a pair of recesses extending across their facing sides intermediate the ends thereof, a spool-like fulcrum socketed in said recesses with the flanged ends thereof spaced closely beside the edges of said arms and effective to hold said arms spaced apart from end to end thereof, torsion spring means embracing said spool with its ends pressed into receiving pockets therefor forming in each of said arms and cooperating with said pockets and with said fulcrum spool to hold said arms firmly but movably assembled against the opposite sides of the spool body, the inner ends of said arms having circular rounded integral protrusions about their remote outer surfaces presenting feeler surfaces adapted to be engaged lightly against the diametrically opposed walls of a bore being measured, the outer ends of said arms having aligned bores formed with sockets on their inner adjacent ends, rotary adjusting means having a spherical surfaced head nested in one of said sockets and having a spherical-surfaced nut threaded thereto near its other end and nested non-rotatably in the other one of said sockets, a pair of circular disc scales including a first relatively large diameter disc scale fixed concentrically to said rotary and positioned between the outer ends of said arms, the other of said disc scales being of relatively small diameter and journalled to the exterior face of one of said arms and having a speed reduction driving connection with said rotary means.

5. A bore caliper as defined in claim 4 characterized in that said circular disc scales have radial markings distributed uniformly about their obverse faces and being so positioned that their respective readout radial lines are in alignment for maximum ease of reading.

6. A bore caliper as defined in claim 5 characterized in that the rim edge of said larger scale protrudes from between and extends outwardly beyond the outer ends of both arms, the rim edge of said large scale being engageable and rotatable by one of the user's digits while said caliper is held between other digits of the same hand, and both scales being positioned for convenient reading as the user holds the caliper in said one hand and manipulates said scales.

References Cited in the file of this patent

UNITED STATES PATENTS

| | | |
|---|---|---|
| 981,127 | Scusa | Jan. 10, 1911 |
| 1,021,384 | Smith | Mar. 26, 1912 |
| 1,266,493 | Lackner | May 14, 1918 |
| 1,532,297 | Bausch et al. | Apr. 7, 1925 |
| 1,672,966 | Wahlberg | June 12, 1928 |
| 2,403,254 | Yankun | July 2, 1946 |
| 2,573,075 | Watson | Oct. 30, 1951 |
| 2,888,833 | Toderick | June 2, 1959 |
| 2,607,961 | Chorlton | May 16, 1960 |

FOREIGN PATENTS

| | | |
|---|---|---|
| 69,149 | France | Oct. 25, 1865 |